(12) United States Patent
Rasmussen et al.

(10) Patent No.: US 6,514,043 B1
(45) Date of Patent: Feb. 4, 2003

(54) WIND TURBINE HUB

(75) Inventors: Flemming Rasmussen, Roskilde (DK); Per Vølund, Roskilde (DK); Jørgen Thirstrup Petersen, Roskilde (DK); Bjørn Johansen, Roskilde (DK); Preben Ellebæk, Karise (DK)

(73) Assignee: Forskningscenter Risø, Roskilde (DK)

( * ) Notice: Subject to any disclaimer, the term of this patent is extended or adjusted under 35 U.S.C. 154(b) by 0 days.

(21) Appl. No.: 09/701,731
(22) PCT Filed: Jun. 3, 1999
(86) PCT No.: PCT/DK99/00294
§ 371 (c)(1), (2), (4) Date: Mar. 5, 2001
(87) PCT Pub. No.: WO99/63218
PCT Pub. Date: Dec. 9, 1999

(30) Foreign Application Priority Data

Jun. 4, 1998 (DK) .......................... 1998 00721

(51) Int. Cl.⁷ .................................. B63H 1/06
(52) U.S. Cl. .................................... 416/134 A
(58) Field of Search .............................. 416/134 A, 131

(56) References Cited

U.S. PATENT DOCUMENTS

| | | |
|---|---|---|
| 4,131,391 A | 12/1978 | Robinson |
| 4,310,284 A | 1/1982 | Randolph |
| 4,366,387 A | 12/1982 | Carter, Jr. et al. |
| 4,534,705 A | 8/1985 | Selestam et al. |
| 4,678,923 A | 7/1987 | Trepanier |
| 5,028,209 A | 7/1991 | Vantonen |

FOREIGN PATENT DOCUMENTS

| | | |
|---|---|---|
| DE | 3113080 | 10/1982 |
| DE | 3113080 A1 | 10/1982 |
| EP | 0619002 B1 | 12/1994 |
| FR | 2658565 A1 | 8/1991 |
| FR | 2658565 | 8/1991 |
| GB | 2029911 | 3/1980 |
| GB | 2029911 A | 3/1980 |

OTHER PUBLICATIONS

"Advanced Wind Turbine Design" P.M. Jamieson, et al, Journal of Solar Energy Engineering, Nov. 1997, vol. 119, pp. 315–320.
"Electrical Thoughts on Wind Driven Generators" Donald Marier, Energy Primer, p. 85.
Jacobs Wind Energy Systems Model 29–20 Wind Turbine, Wind Turbine Industries Corp., 2 pgs.
"A Lightweight 3–Bladed 600kW Wind Turbine", J.R.C. Armstrong, 1996 European Union Wind Energy Conference, May 20–24, 1996, pp. 223–226.
"Light Can Be Tough", J.R.C. Armstrong, Wind Energy Group, 1997.

Primary Examiner—Edward K. Look
Assistant Examiner—Kimya N. McCoy
(74) Attorney, Agent, or Firm—Birch, Stewart, Kolasch & Birch, LLP

(57) ABSTRACT

The present invention relates to a hub assembly of a rotor for holding at least one wing, wherein the at least one wing is connected/mounted to the hub assembly in at least two suspension points. The hub assembly may be applied to any kind of either energy extracting devices such as wind turbines or the like or lift producing devices such as helicopter rotors or propellers. The invention is suited for rotors in general and is able to enable coning movement of wings connected/mounted to the hub assembly, enable teetering movement of the rotor and enable alteration of the pitch angle of the wings connected/mounted to the hub assembly. The hub assembly according to the present invention provides a hub where the pitching of the wings can occur synchronously/simultaneously due to an interconnection of the wings attached/mounted to the hub assembly and where coning of the wings may be applied at the same time with pitching of the wings and teetering of the rotor.

21 Claims, 7 Drawing Sheets

WIND TURBINE HUB

The present invention relates to a hub assembly of a rotor for holding at least one wing, wherein the at least one wing is connected/mounted to the hub assembly in at least two suspension points. The hub assembly may be applied to any kind of either energy extracting devices such as wind turbines or the like or lift producing devices such as helicopter rotors or propellers.

The invention is suited for rotors in general and is able to enable coning movement of wings connected/mounted to the hub assembly, enable teetering movement of the rotor and enable alteration of the pitch angle of the wings connected/mounted to the hub assembly. The hub assembly according to the present invention provides a hub where all the pitching of the wings can occur synchronously/simultaneous due to an interconnection of the wings attached/mounted to the hub assembly and that coning of the wings may be applied at the same time with pitching of the wings and teetering of the rotor.

The usual approach to enable at least the pitching movement of the wings connected / mounted to the hub assembly is to mount the wings to the hub assembly by connecting the wing root to the hub via a ball bearing or similar bearing. This connection is usually centred close to the aerodynamic centre of the wing section, i.e. the point where the pitching moment resulting from the aerodynamic load on the wing is substantially zero.

The pitching of wings connected/mounted to the hub assembly in the usual manner is usually enabled by applying transmission system such as gearboxes, hydraulic pistons or the like to rotate the wings along theirs longitudinal direction. These gearboxes must some how be interconnect in order to assure synchronous/simultaneous pitching. Furthermore, the mounting/connection of the wings through wing root bearing or the like makes it very difficult to enable the wings to cone,.as this usually requires very expensive bearing and the application of springs and hydraulic systems to control the coning.

Furthermore, a teetering movement of the rotor is usually avoided even though such a motion is very desirable, as no workable solution has been found until now. A workable solution means that the solution should be strong, some how simple in order to avoid damages and reliable, so that operation of for instance a wind turbine is efficient even during high stress conditions and fatigue loads.

Thus, it is an aim of the present invention to provide a rotor comprising a hub assembly and at least one wing, where the pitch of the wing may be controlled by displacing at least one of at least two suspension point used for connecting I mounting at wing to the hub assembly.

From the prior art, hub assemblies allowing pitching and coning of the wings are known.

On such example is U.S. Pat. No. 4,131,391 which discloses a hub assembly for a helicopter where each wing is connected to the hub assembly via a serial connection comprising a bearing and a hinge. The bearing allows the wing to rotate around it longitudinal direction in order to adjust theirs pitch angle and the hinge allows the wing to cone. The pitch angle o the wings is adjusted by a rod connected to the bearing and acting at the periphery of the bearing in order to provide a lever used for rotating the blade.

A major problem of such known assemblies is that they do not allow the wings to be connected/mounted to the hub assembly in at least two suspensions point as the pitching of the wings is to be performed by rotating the wings in a bearing centred in the aerodynamic centre of the wings, which centering is crucial in the known hub assemblies as minimum pitching torque is indispensable in these cases.

U.S. Pat. No. 4,678,923 discloses a hub assembly for a wind turbine. The wings are connected to the hub by means of at least two resilient strips which are oppositely inclined both in the plane of rotation of the wings and in a plane extending through the rotational axis of the hub. In particular, each wing is connected to flanges of the hub by means of said two resilient strips in the sense that one strip connects the wing with a first flange and the other strip connects the wing with a second flange.

GB 2 029 911 discloses a connection arrangement for connecting a wing having a load bearing shell to a hub of a wind turbine. The arrangement comprises an inner sleeve connected to the hub and an outer sleeve connected to the wing. The wing is being connected to the hub by securing by bolts the inner and the outer sleeves to each other.

A major problem of such known assemblies and arrangements is that pitching of one wing of the rotor is de-coupled from pitching of another wing of the rotor (in the sense that pitching of one wing is not mechanically fed back to other wings) whereby each of the wing may be operating at its own pitch angle.

BRIEF DESCRIPTION OF THE INVENTION

The present invention provides a novel, simple and effective alternative to known rotors with hub assemblies. The present invention also provides a rotor with hub assembly that, besides from being cheaper than prior art rotors and hub assemblies, also allow the application of wings without the usual applied main spar extending inside wings in theirs entire length, whereby the weight of the wings and thereby the weight of the rotor may be smaller than usual which most often will provide a rotor more efficiently controlled.

Thus, in a first aspect, the present invention relates to a rotor having an axis of rotation said rotor comprising a hub assembly and at least one wing having a leading edge and a trailing edge, said at least one wing being connected/mounted to the hub assembly in at least two suspensions points so that the pitch of the wing may be controlled by displacing at least one of the suspensions points.

The at least one wing connected/mounted to the hub assembly extends from a root section to a tip section, and the wing is preferably connected/mounted to the hub assembly at the root section. By this way of connecting/mounting the wing to the hub assembly, a very advantageous way of controlling the pitch of the at least one wing is provided. As only one of the suspension points need to be displaced the wing does not have be connected I mounted to the hub assembly via a large and expensive ball bearing centred in the Aerodynamic centre of the wing. Furthermore, as only one suspension point needs to be displaced the need for a gearbox or the like used for turning the wing in a ball bearing is also not needed.

Furthermore, by having the two suspension points situated at or in the vicinity of the leading edge and the trailing edge of the wing shell, its torsional stiffness is effectively used to transfer driving torque loads.

A typical displacement of the at least one displacement point is a displacement substantially normal to the plane defined by the rotation of the wing, but the invention is not limited to this situation, as a change of the pitch of the wing may be accomplished by all possible displacements of at least one suspension point as long as such a displacement has a component in the direction normal to the plane defined by the rotation of the wing.

Preferably, the pitch of the at least one wing is controlled by a general mutual relative displacement of the suspension points.

In a preferred embodiment of the present invention, the at least two suspension points are situated/arranged on a circle having its centre in the centre of the axis of rotation of the rotor. In this preferred embodiment of the present invention, the suspension of the wing is neutral in the sense that substantially no interaction is present between a flap load (a load on the wing in the direction of the in going wind) and the pitching of the wing.

Furthermore, the suspension points are in a presently most preferred embodiment arranged in the vicinity of the leading edge and in the vicinity of the trailing edge of the wing. Covered by this situation is also the arrangement where the suspension points in arranged in the leading edge region and/or in the trailing edge region of the wing.

In another preferred embodiment of the present invention, the at least two suspension points are situated/arranged on two circles having different radii and having the same centre, which centre is situated in the centre of the axis of rotation. In this preferred embodiment of the present invention, it is possible to obtain an interaction between a flap load and the pitch angle of the wing, as a flap load, which has a force component normal to a line passing through the at least two suspension points will give rise to change of the pitch of the wing.

Preferably, the hub assembly comprises at least two hub main parts each of which is pivotally connected to a central hub part of the hub assembly so that the at least two hub main parts of the hub assembly may be rotated around an axis being inclined with respect to a longitudinal direction of each of the hub main parts so as to displace at least one of the suspension points whereby the pitch of the at least one wing is altered.

The central hub part of the rotor assembly, typically denotes a teeter shaft, connects in a preferred embodiment of the invention the two hub main parts in such a manner as to allow the two main hub parts to rotate around the longitudinal direction of the teeter shaft. The connection of the hub main parts to the teeter shaft is preferably a rubber bearing or a ball bearing so as to allow the rotation of the hub main parts to rotate around the longitudinal direction of the teeter shaft. Rubber bearings are preferably applied when a stiffness and/or flexibility is needed and ball bearings are preferably applied when low friction connections are needed. Bearings such as roll bearings, bushings or flexible connections made of flexible materials may be used.

In a presently most preferred embodiment of the invention, the pitching of the wing is provided by rotating the two main hub parts in opposite directions substantially asynchronously (when view from one side), whereby the wing attached/connected to the hub main parts at theirs extremities at the suspension points will cause the wing to rotate around its longitudinal direction as these suspension points will be displaced in opposite directions.

In the presently most preferred embodiment of the invention the angle between the central hub part (teeter shaft) and each of the two hub main parts is typically around 90° whereby substantially no interaction between a flap load and pitching of the wing is present.

The angle between the central hub part (teeter shaft) and the two hub main parts may preferably be made different from 90° in order to provide an interaction between a flap load and pitching of the wing. Preferably angles such as between 90–80°, and in some situation between 80–70°, and even angles between 70–60° may be preferred, which in some situations is preferred between 60–50°.

In a preferred embodiment of the present invention the central part of the hub assembly is substantially rigidly connected to a main shaft of the rotor. In such a preferred embodiment a teeter movement, i.e. a motion where the angle between the plane defined by the rotation of the wing (the rotor plane) and for instance the angle of rotation of the rotor may be varied, is provided by synchronous rotation of the two hub main parts around the teeter shaft (the hub central part).

This rigidly connection may also provide a rotor wherein substantially no teeter movement of the rotor is possible. In such a situation the two hub main parts are connected to the hub central part in such a way that only an asynchronous movement of the hub main parts is possible.

In another preferred embodiment of the present invention the central part of the hub assembly is pivotally connected to the main shaft so as to allow the angle between the plane defined by the sweeping motion of the at least one wing upon rotation and the axis of rotation of the main shaft to be a geometrical degree of freedom, which movement is typically denoted a teeter movement of the rotor.

In this embodiment the connection of the hub central part to the main shaft may be provided by a hinge, whereby the teeter movement of the rotor is provided at the same time as the torque produced by the rotor can be transferred to the main shaft of the rotor.

This way of hinging the hub central part to the main shaft of the rotor may advantageous be combined with the above described connection of the two hub main parts to the hub central part allowing the rotor to teeter or the connection disabling a synchronous movement of the two main hub parts. In the first case the teeter movement of the rotor is possible as more than one connection provides a very flexible rotor and in the second case, the teeter movement of the rotor is provided by only one connection whereby a more easy control of the teeter movement may be possible.

In the presently most preferred embodiment of the present invention, each of the hub main parts is pivotally connected to a central part of the hub assembly in such a manner that the at least two main parts of the hub assembly may be rotated synchronously/simultaneously around an axis being inclined with respect to the longitudinal direction of each of the hub main parts so as to allow the angle between the plane defined by the sweeping motion of the at least one wing upon rotation and the axis of rotation of the main shaft to be a geometrical degree of freedom In the presently most preferred embodiment of the present invention the hub assembly further comprises connecting means/mounting means arranged at each suspension point for hingedly connecting/mounting the at least one wing to the hub main parts so as to allow the angle between the longitudinal extension of the wing and the axis of rotation of the rotor to be a geometrical degree of freedom whereby the wing may cone.

Such a coning of the wing is very advantageous as such a movement of the wing may reduce the axial thrust and flapwise load or may be used for controlling the torque applied from the rotor to the main shaft in case the rotor is an energy-extracting rotor. When maximum torque is to be reduced the wings may be coned. Such a coning may be controlled actively or it may be the result of the load on the wing or a combination of both. In a preferred embodiment of the present invention the hub assembly further comprises means for controlling the coning of the at least one wing whereby the coning of the wing may be made different from the coning occurring as an interaction between the centrifugal force produced by the rotation of the wing and the aerodynamic loads on the wings.

These means for controlling the coning of the wing may preferably be provided by applying a stiffness to the connecting/mounting means, which may for instance be provided by applying connecting/mounting means made of an indulgent material such as rubber or a composite or the like. It should be noted, that combinations of mounting means being constituted by bearings and means made of an indulgent material may be applied according to the present invention in order to control the coning movement of the wings.

In one embodiment of the present invention the coning controlling means is a flex-beam made of a flexible material, which beam is attached to at least the root section of the at least one wing and to the hub assembly which also preferably may be combined with the above described connecting/mounting means.

This flex-beam will provide, due to its stiffness, stiffness to the coning movement of the wing. When the wing starts to cone the flex-beam will have to bend as the flex-beam is connected to the wing and hub assembly. The flex-beam may preferably also serve the purpose of controlling the maximum coning of the wing. Such a control is very advantageous for instance when the rotor is situated upstream for instance a tower of a wind turbine. In this situation, it is crucial to be able to control the coning in order to assure that a wing does not hit the tower when it cone.

The flex-beam may preferably be an integral part of the wing and the flex-beam may preferably be connected to the hub assembly via a hydraulic means, such as a hydraulic piston, in order to provide a control of the coning movement of the wing. The hydraulic means may in this embodiment of the invention then make it possible to control the coning of the wing and at the same time have a flex-beam which balances the aerodynamic load on the wing.

In an embodiment not having a flex-beam, the coning of the wing may be provided and controlled by a coning controlling means which preferably may be a hydraulic means connected to a wing and to the hub assembly. Such a coning controlling means may, of course, be combined with a flex-beam.

In a presently most preferred embodiment of the present invention the rotor has at least two wings, and the hub assembly further comprises at least one auxiliary part having a crossbeam extending from one hub main part to a position where another hub main part of the rotor assembly is connected to the hub central part. This connection may preferably be constituted by use of bearings such as rubber bearings, ball bearings or flexible connections.

By applying such and auxiliary part to the hub main parts, the stiffness of the hub main parts may be improved and the forces applied to the each of the bearings through which the hub main parts are connected to the teeter shaft may in this embodiment be lowered as the forces now may be distributed to more bearings.

The hub assembly may in this preferred embodiment further comprise at least one support member extending from one hub main part to the crossbeam extending from the same hub main part. This at least one support member may provide a further stiffness to the hub assembly and furthermore serve as an attachment member where each of the flex-beams of each wing is connected to.

In a preferred embodiment of the present invention the auxiliary part is an integral part of each of the hub main parts, which preferably is triangular shaped.

The hub assembly further comprises means for controlling the pitch of the wing. The pitch controlling means is used for rotating the two hub main parts of the hub assembly synchronous in order to displace the at least two suspension point in opposite direction so as to alter the pitch of the wing attached/connected to the two hub main parts.

In order to provide an opposite displacement of the two suspension points in which each wing is connected X attached to the hub assembly and at the same time allowing the rotor to teeter, the pitch controlling means is preferably a hydraulic piston connected at one end to one hub main part and at the other end to another hub main part. The position in which the piston—or other similar means for adjusting the pitch —is connected to the hub main parts must be elevated with respect to a line passing through two corresponding suspension points of two wings in order to provide the possibility of decreasing/increasing the direct distance between such two suspension point, which decrease/increase is needed in order to displace the suspension points.

In preferred embodiments wherein the teeter movement of the rotor is provided by for instance a hinge for hinging the central part of the hub assembly to the main shaft of the rotor or where no teeter movement is provided, the pitch controlling means may preferably be a hydraulic piston connected at one end to the central part of the hub assembly and at the other end to a hub main part.

In a presently most preferred embodiment of the present invention the rotor comprises at least two wings, and each of the hub main parts extends at least from one suspension point arranged substantially in the vicinity of the leading edge of the root section of one wing pass the hub central part and to another suspension point arranged substantially in the vicinity of the trailing edge of the root section of another wing.

The wording substantially in the vicinity of the leading edge and trailing edge covers also the situation where the position where the suspension points is arranged in the leading and trailing edge region of the wing.

A very advantageous and desirable interaction between pitching of the wings is provided, by extending the hub main parts from one wing to another. As the wings so are interconnected a change of the distance between a suspension point situated in the vicinity of the leading edge of a first wing and a suspension point situated in the vicinity of the leading edge of a second wing will change the pitch of both wings synchronously.

Furthermore, the teeter movement of the rotor may be provided and may be uncoupled from the pitching movement of the wings in this preferred embodiment of the invention when the hub main parts are connected to the hub central part through bearing. This teetering movement may preferably be controlled by providing the hub assembly a teeter stiffness for controlling the teeter motion of each of the at least one wing, for instance provided by the bearings through which the hub main parts are connected to the hub central part which in such a situation preferably are rubber bearings and wherein the teeter stiffness is provided by at least one of the rubber bearings.

Preferably each of the at least one wing(s) is(are) connected/mounted to the hub main parts at the suspension points by use of spherical bearings. By use of spherical bearings two geometrical degrees of freedom are provided, which degrees of freedom are very advantageous as pitching of wings requires one degree of freedom and as a coning of the wings also requires one degree of freedom.

The hub assembly described above, may very advantageous be applied for a rotor comprises three wings and is in the presently most preferred embodiment of the present invention applied in a rotor configuration comprising two wings.

Another very important and advantageous aspect of the present invention relates to a wing having a load-bearing shell. In the presently most preferred embodiment of the invention, the wing having a load bearing shell is applied for a rotor of a wind turbine, but the wing may be applied to all kind of rotors, specially when the wing is connected/mounted to a hub assembly by use of at least two suspension points.

The wing having a load-bearing shell according to the present invention, is preferably applied in a rotor assembly wherein each wing of the rotor assembly is connected/mounted to the hub assembly in two suspension points, which suspension points is preferably situated in the vicinity of respectively the leading edge and the trailing edge of the wings. The load bearing shell transfers the aerodynamic loads acting on the shell to the suspension points.

The load bearing shell is preferably made of reinforced plastic or the like or a metal sheet or the like and forms the aerodynamic share and the interior of the wing is preferably hollow or made of foam.

Preferably the wing comprises two means for connecting/mounting for connecting/mounting the wing to a hub. These connecting/mounting means may preferably be a part of for instance a spherical bearing used in order to provide either one or two degrees of freedom.

As the loads on the wings are transferred to the leading and trailing edge of the wing, the wing may preferably be reinforced in the vicinity of the connecting means I mounting mean, and in such a preferred embodiment of the wing according to the present invention the connecting means/mounting means are preferably arranged in the vicinity of the leading edge.

BRIEF DESCRIPTION OF THE DRAWINGS

A detailed description of the invention, in particular of preferred embodiments thereof, now follows in conjunction with the appended figures in which.

GENERAL DESCRIPTION OF THE INVENTION

The basic principle of the rotor according to the present invention is a three-hinge configuration, in which each wing are connected/mounted to the hub, which in turn is hinged to the main shaft of the wind turbine. The hinges are being constituted by bearings or other flexible elements. The wing hinges are provided a predetermined stiffness against angular motion by use of so called "flex-beams", which at the same time regulates the maximum flap load (the wing load in the direction of the wind). At extreme wind velocities, the wings bend 60–70 degrees in downstream direction in order to reduce loads on the wind turbine. By this, the flap load is reduced so much that the wings only needs to be dimensioned for edge wise load (load in the moving direction of the wings), which load most appropriately is taken up as a pair of loads in the leading edge and trailing edge of the wing. This possesses a most appropriately distribution of material in the wing as nearly all material being load-bearing may be arranged in the leading edge and trailing edge of the wing whereby the usual main spar for transferring of flap loads between the upper and lower side of the wing may be avoided. A general example of a rotor with corresponding connections is shown in FIG. 1 and a hub with corresponding wing is shown in FIG. 2.

Figure 1:
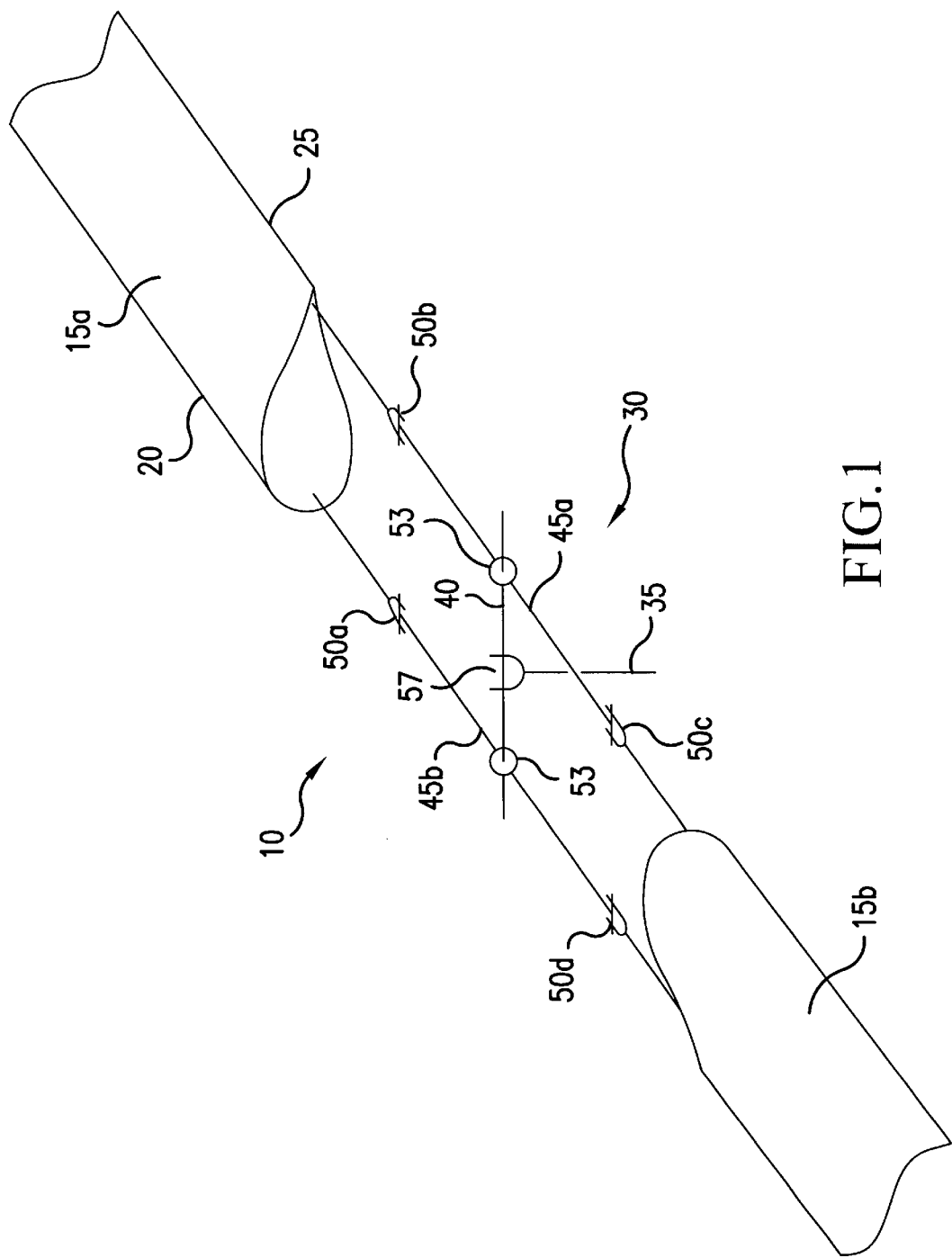
FIG. 1 is an exemplified drawing of the rotor according to the present invention; the rotor comprises two wings.
Figure 2:
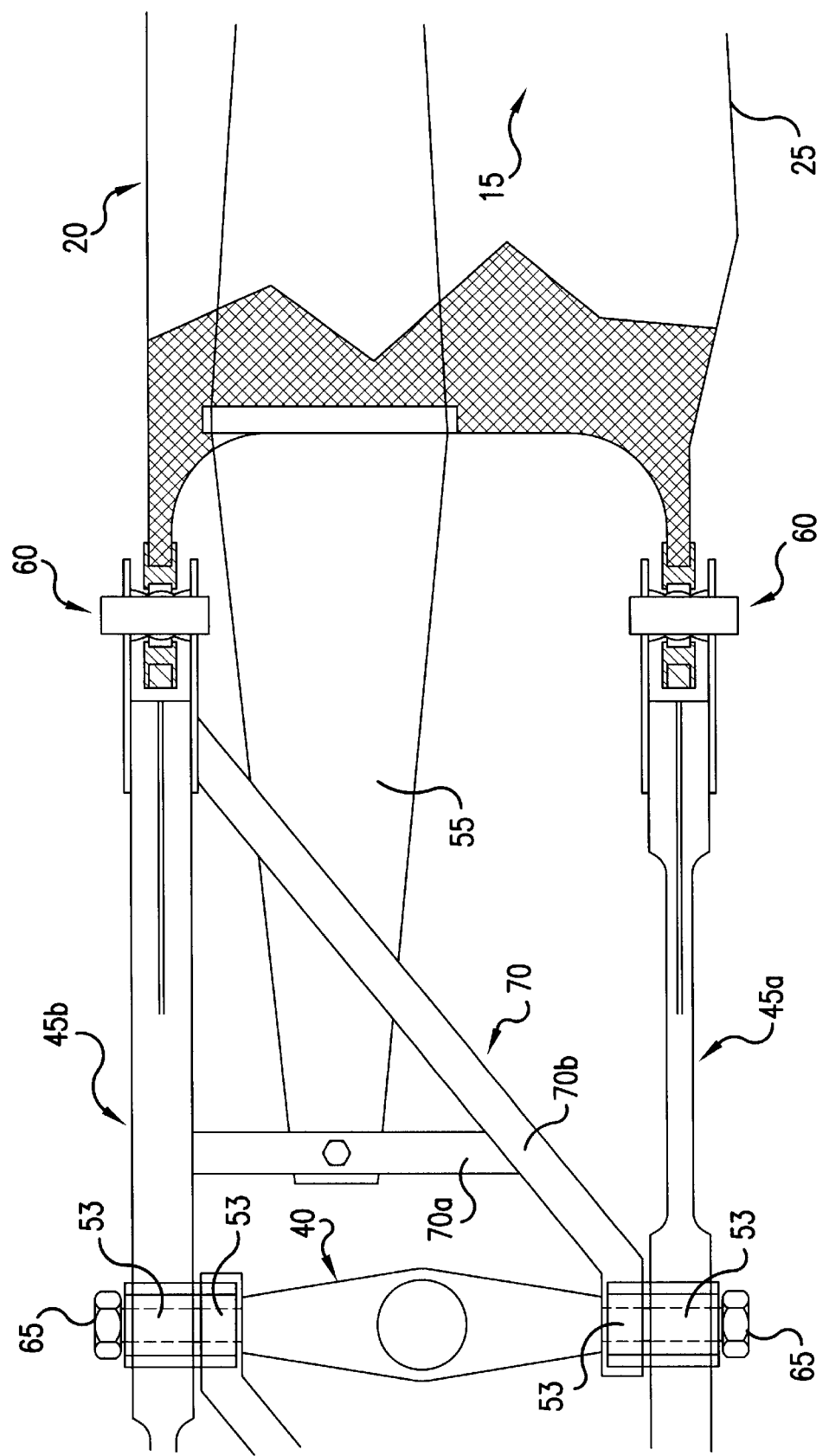
FIG. 2 is a drawing of a preferred embodiment of a hub assembly according to the present invention; the drawing shows only a cut out of the whole rotor.

The wings are connected/mounted to the hub which in the exemplified preferred embodiment shown in FIG. 1 and FIG. 2 is H-shaped. The two parts of the hub may be teetered around a teeter shaft connected to the main shaft and may at the same time be rotated relatively to each other around the teeter shaft. This last rotation result in that the wings are pitched synchronously around theirs longitudinal axis. The pitch setting of the wings is necessary in order to be able to adjust the maximum effect of the wind turbine and in order to achieve an air brake function of the wings (approximate –12 degrees rotation).

Figure 3:
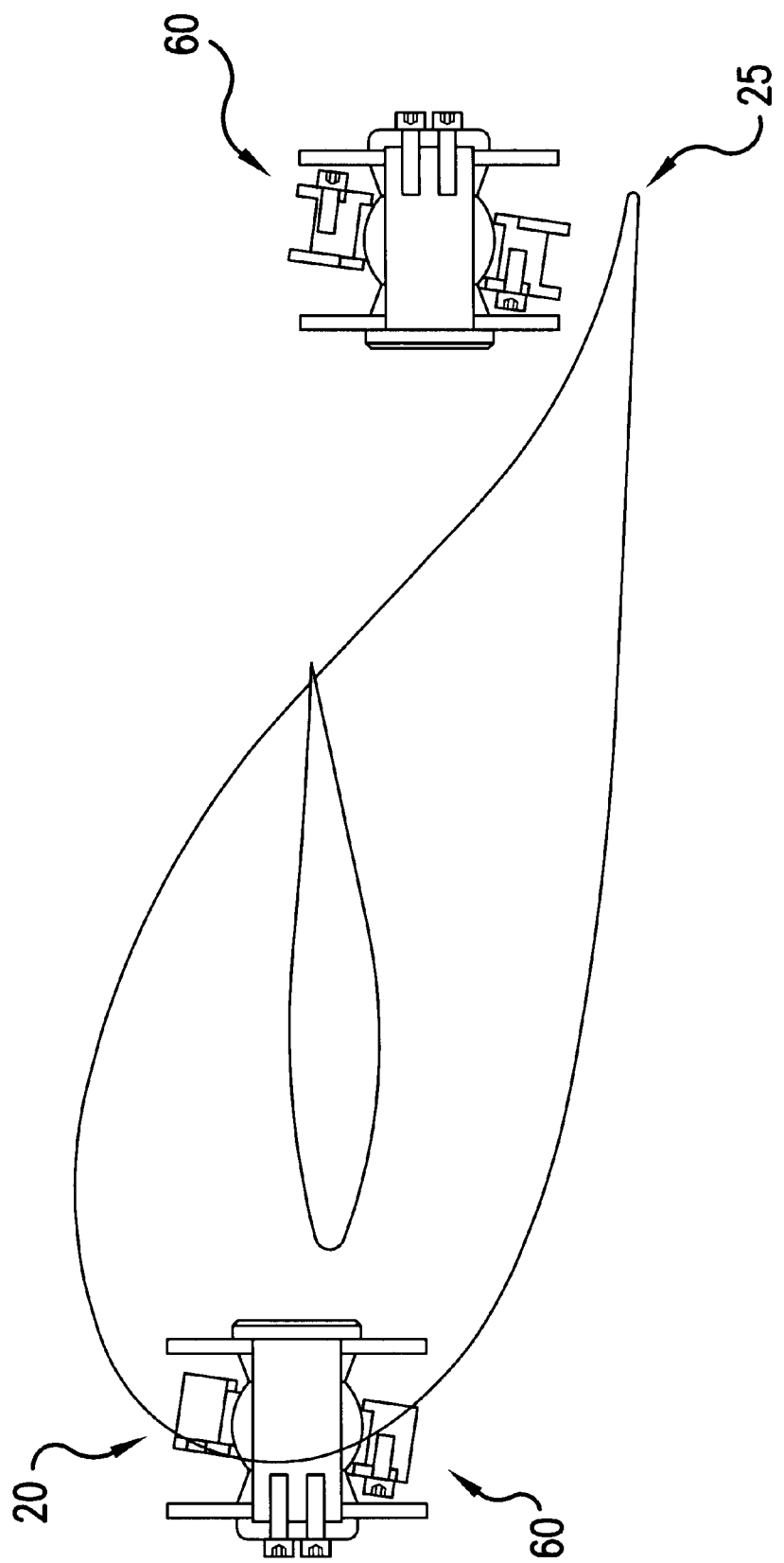
FIG. 3 is a cross sectional drawing of a rotor according to the present invention showing the orientation of the hinges hinging the wings to the hub.

An important feature of the present invention is the action of the hub shown in FIGS. 1 and 2, and this feature is important in order to achieve optimum exploitation of the design benefits of the wing. Another important feature of the present invention is the orientation of the hinges in respect to the rotor plane and the plane important with respect to the dynamic of the wind turbine. The orientation of the hinges of the wings is in the embodiment of the present invention shown in FIG. 3 indicated to 8 degrees in respect to the rotor plane. The angle to the rotor plane is approximately 8° in order to create coupling between flapwise and edgewise deflections which reduces vibrations.

DETAILED DESCRIPTIONS OF PREFERRED EMBODIMENTS OF THE INVENTION

In FIG. 1 a rotor 10 according to the present invention is shown schematically. In this embodiment, the rotor 10 comprises wings 15$a,b$ having leading edges 20 and trailing edges 25, a hub 30, a main shaft 35 and a teeter shaft 40. The hub comprises two hub main parts 45$a$ and 45$b$, where hub main part 45$b$ extends from hinge 50$a$ arranged in the vicinity of the leading edge 20 of wing 25$a$ to a hinge 50$d$ arranged in the vicinity of the trailing edge 25 of wing 15$b$. Similarly, the hub main part 45$a$ extends from a hinge 50$b$ arranged at the trailing edge 25 of wing 15$a$ to a hinge 50$c$ arranged at the leading edge 20 of wing 15$a$.

The two hub main parts 45$a$ and 45$b$ are connected to the teeter shaft through bearings 53 allowing the two hub main parts 45$a,b$ to rotate around the longitudinal direction of the teeter shaft 40. The teeter shaft 40 is in turn connected to the main shaft 35 through a hinge 57 allowing the teeter shaft to rotate around its longitudinal direction.

The hinge 57 through which the teeter shaft is connected to the main shaft 35 may be dispensed in this embodiment of the invention as the bearings through which the hub main parts 45$a$ and 45$b$ are connected to the teeter shaft may provide the teeter movement of the rotor.

By this way of hinging the wings 15$a$ and $b$ to the main shaft 35 the rotor is able to teeter and the wings are able to cone as well as being able to pitch.

Furthermore, the pitch angle of each of the wings 15*a* and *b* is set or controlled synchronously due to the hub main parts 45*a* and 45*b*. As these parts are pivotally connected to the teeter shaft 40 a rotation of the wing 15 a around its longitudinal direction in clock-wise direction will cause the hub main part 45*b* to rotate around the longitudinal direction of the teeter shaft 40 which in turn causes the wing 15*b* also to rotate clock-wise around its longitudinal direction due to the coupling of the wings by the second hub main part 45*a*. It should be noted, that this description only covers one way of looking at the dynamics involved in the interaction between the two wings 15*a* and *b*, as this interaction actually is cyclic in the sense that all the actions occur simultaneous.

As the hinges 50*a*, *b* and 50*c*, *d* allow the wings to cone a resistance must be applied to these hinges so that the wings 15*a*, *b* may be able to sustain the forces of the wind acting on the wings in a direction normal to surface of the wings, otherwise the coning of the wings would only be controlled —even though this may be preferred in certain preferred embodiments of the invention —by the centrifugal forces resulting from the rotation of the wings 15*a*, *b*.

Such a resistance is in the preferred embodiment shown in FIG. 2 a so called flex-beam general indicated by numeral 55 providing a suitable stiffness and at the same time allowing the wing to cone. In general the flex-beam 55 should allow the wing to cone so much as 60–70° in order to reduce the thrust of the rotor, in case the rotor is working at down-wind conditions.

Additionally, the flex-beam 55 may also be designed to control the pitch of the wings, and in this case the flex-beam should be able to and be designed to withstand torsion, as torsion would be applied to it when the wings pitch.

In practise, the flex-beam 55 will have to be able to withstand torsion even though the hinging of the wings at the leading edge and the trailing edge will substantially separate the function for the shell of the blade and the flex-beam, i.e. the blade shell mainly transfers the edgewise loads (driving torque) and a relatively small flapwise load is exerted by the bending motion of the flex-beam.

By including the flex-beam 55 as indicated in FIG. 2, which is showing only one half of the hub assembly in a preferred embodiment of the invention, the wing has in principle a three-point support structure by the hub, which system is applicable for any size of turbine.

The flex-beam may also be dimensioned so that the coning of the wings is lower than a predetermined angle in order to avoid the possibility of a wing hitting the tower of the wind turbine in case the rotor according to the present invention is used in the so-called front running wind turbine, i.e. a wind turbine operating in the situation where the wind hits the wings before it hits the tower. Alternatively, the bearings may be so constructed so as to allow only a certain coning of the wings which in turn may be connected to a controlling system pitching the wings when the coning increases by a predetermined amount being smaller than the maximum conning.

In the preferred embodiment of the rotor of FIG. 2 the flex-beam 55 is connected to the hub by use of an auxiliary part 70 comprising a crossbeam 70*a* and a support member 70*b*. As the two hub main parts 45*a* and 45*b* must be able to rotate in opposite directions when the pitch of the wings is altered and as the flex-beam based on structural considerations most preferably must be connected besides one of the hub main parts, say 45*a*, a crossbeam must be applied. This crossbeam cannot be connected to the other hub main part, say 45*b*, and therefore the crossbeam 70 is supported by the support member 70*b* which in turn is connected to the hub main part, say 45, at the vicinity of the hinge 60 at the leading edge of the wing and to the teeter shaft 40 by use of a bearing. Alternatively, the auxiliary part 70 may be made as an integral part of the hub main part.

For instance hydraulic damping means and/or springs or similar means may also provide or even complete the coning stiffness. One such example is where coning vibrations of the wing occur. Applying a hydraulic damping device such as a passive hydraulic friction clutch to the bearings 60 may damp such vibrations.

Active coning control may be provided to the hub by connecting the flex-beam to a hydraulic piston, which in turn is connected to the crossbeam. By connecting the flex-beam to the crossbeam through a hydraulic piston, the coning angle of the wings may vary and at the same time the wings will be able to cone by influence of the wind.

Furthermore, the flex-beam may in this situation be made very stiff totally control of the coning of the wings is gained and besides the effect that the wind turbine can be controlled very efficiently, the control of the coning may be used as a safety brake used for braking the rotation of the wings for instance when the velocity of the wind exceeds a predetermined limit.

The setting/controlling of the pitch angle of the wings is in the first preferred embodiment of the rotor performed by providing at least one hydraulic piston to the rotor 10. This hydraulic piston is in a preferred embodiment arranged in connection to the rotor 10 so that one part of the piston is connected to one of the hub main parts, say 45*a*, and the other part of the piston is connected to the other hub main part, say 45*b*. This way of connecting the piston is necessary in the situation where the rotor must be able to teeter, as if one end of the piston was connected to one of the hub main parts and the other end was connected to for instance the main shaft 35 the teeter motion of the rotor would be influenced by the hydraulic piston.

Therefore, it is preferred to connect the hydraulic piston to the main hub part 45*a* and 45*b* in a position being elevated from a line passing through the each of the hinges say 50*a* and 50*d* of main hub part 45*b* and a corresponding point of the other main hub part. The hydraulic piston connects in the preferred embodiment the two crossbeams 70*a* of the rotor assembly shown in FIG. 7.

Figure 7:
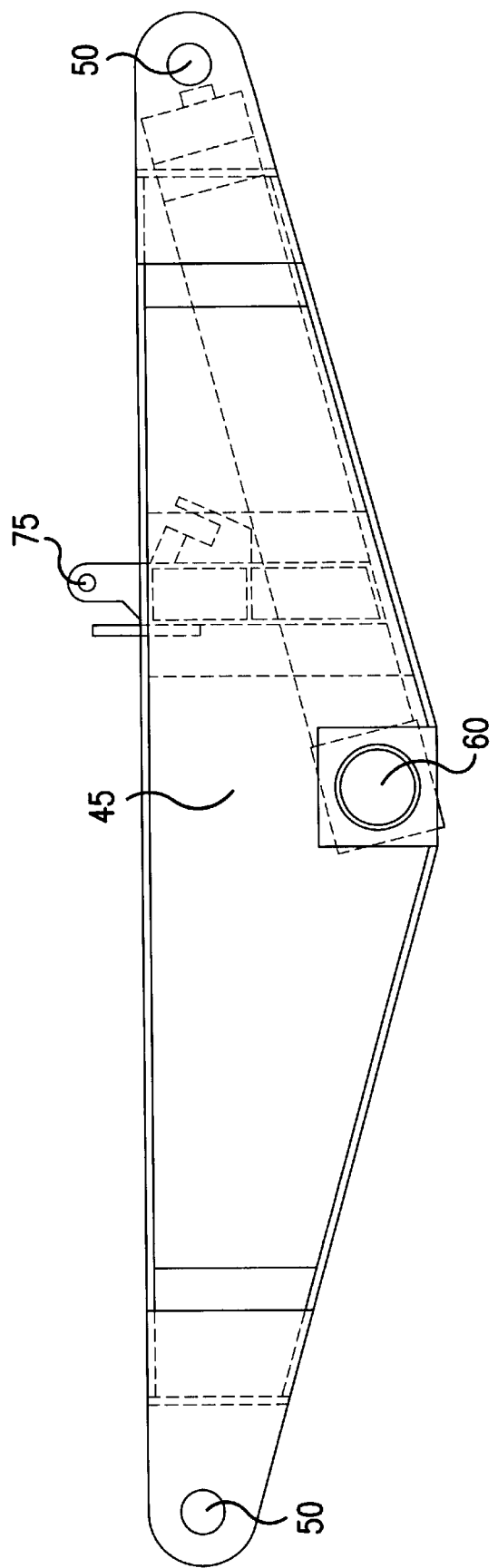
FIG. 7 is a side view of a hub main part of the hub according to the present invention.

In the preferred embodiment shown in FIG. 7, the elevated point is indicated by numeral 75. As shown in FIG. 7, the hub main part is triangular shaped when viewed upon from the side of it and the hinges 50 used for connecting the wings to the hub main part 45 is arranged elevated relatively to the position of the bearing 60, and the point 75 is further elevated relatively to this position. As the attachment point 75 of the hydraulic piston is elevated as just described, shortening or elongation of the piston will reduce (or increase depending on the motion of the piston) the distance between hinges 50*d* and 50*b* for instance will also reduce (or increase) and as the motion of the hinges 50*a* and 50*c* is opposite to the motion of the hinges 50*d* and 50*b*, the pitch of the wings will change.

The wings 15*a*, *b* are hinged in the leading edge 20 and in the trailing edge 25 in two spherical bearings 60 allowing the wings to rotate in two geometrical dimensions, i.e. rotation around the longitudinal direction of the bearings and around the longitudinal direction of the hub main parts 45*a* and 45*b*. This arrangement is shown in FIG. 2. The hub 30 comprises in this preferred embodiment two identical parts, each of which is connected to one bearing 60 of each wing.

The two hub main parts 45a and 45b are supported by the teeter shaft 40 in four rubber bearings 53 and are secured to the teeter shaft 40 by bolts 65. The four rubber bearings have two functions: it constitutes the teeter bearing including teeter stiffness, and it allows the parts of the hub 30 to rotate relatively to each other around the same teeter bearings. This last function causes the simultaneous pitching of the wings (as described above) and the simultaneous pitching of the wings is activated by a hydraulic piston, which represent the possibility for active stall regulation.

The rotor according to the preferred embodiment of the invention besides the pitch altering function includes also an airbrake function being provided also by the hydraulic piston. The airbrake function, which is obtained by pitching of the wings, for instance about 12° towards stall, constitutes an integral part of the design of the hub 30.

The airbrake function may also be constituted or even supplied to the above described airbrake function by including turnable tips to the wings. Such a turnable tip, which is typically controlled by the centrifugal force introduced by the rotation of the rotor, comprises a threaded part, which during normal operation is located inside the wing and a spring biasing the tip towards the centre of the hub 30. In case the centrifugal force, caused by the rotational speed of the wing, increases above the biasing of the spring the tip starts to move away from the wings and the threaded part of the tip will at the same time turn the tip, whereby the tip may be oriented relatively to the rotation to the rotor in a position where it will decrease the speed of the rotor.

The hub main parts 45a and 45b are also provided a flexibility to take up the distortion occurring when the pitch of the wings is altered with respect to the a neutral position of the hub assembly 30. The neutral position is the position in which the wings are mounted to the hub assembly and one such neutral position is shown on FIG. 3. When the pitch angle of the wings is altered, one of the bearings will be dislocated upwards with respect to the orientation of the FIG. 3 and the other bearing will be dislocated downwards. As the distance between the bearings 60 of FIG. 3 can not be altered and as the hub main parts rotates around the teeter shaft 40, the hub main parts 45a and 45b must bend in order to adapt them selves to the dislocations.

This distortion of the hub main parts 45a and 45b may be applied to make the rotor self adjustable in the sense that the pitch of the wings will tends to go back to the pitch of the neutral position in case no external regulating force is applied to the hub assembly 30

A very desirable feature of connecting/mounting the wings at two suspension points arranged in the leading/trailing edge region of the wings is that the flap load (or pitch moment) "naturally" pitch the wings into stall. This effect is further exploited when the wings is being interconnected by the hub main parts 45a and 45b, as this interconnection will provide a synchronous pitching of the wings.

Furthermore, in the embodiment of the invention where the wings are connected to the hub main part 45a and 45b by use of rubber bearing these rubber bearings may be biased to the pitch angle of the wings, which biasing will help the pitching of the wing—together with the action of the centrifugal force acting on the wing —into stall.

Figure 4:
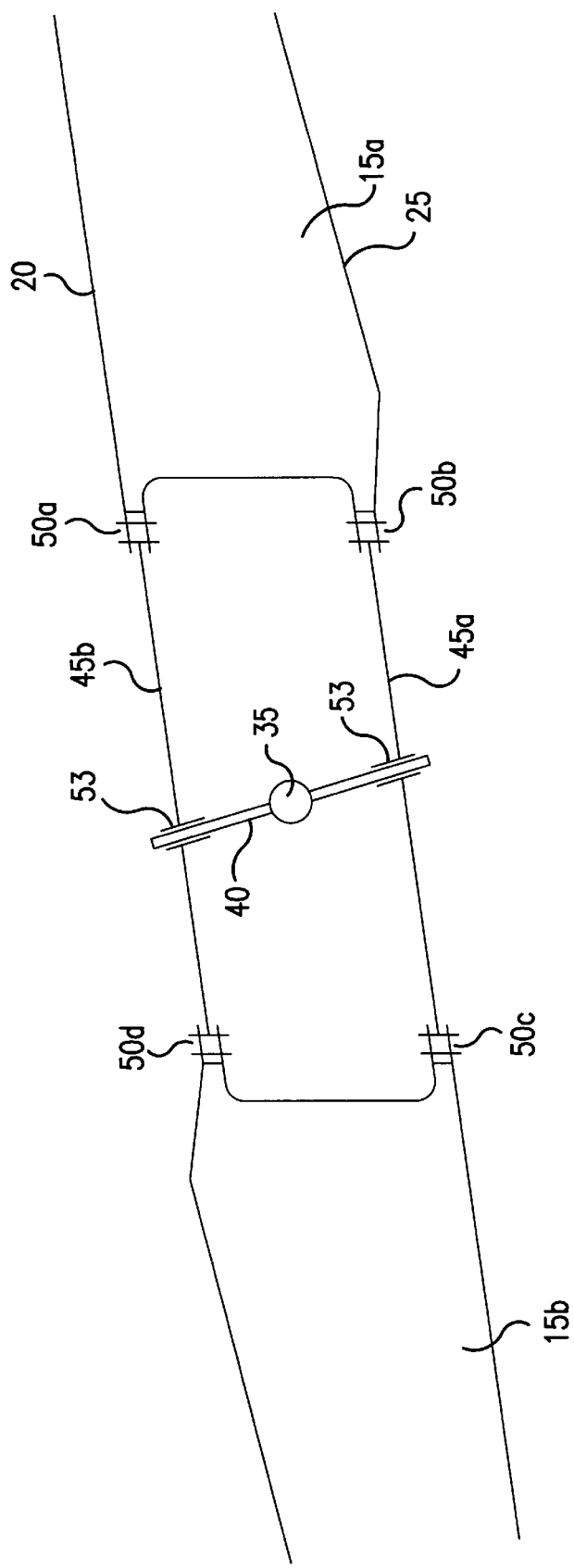
FIG. 4 is an exemplified drawing of a second preferred embodiment of an rotor according to the present invention.

The teeter shaft 40 is in the embodiment shown in FIG. 4 angled with respect to a line passing through the hinges 50a and b or 50c and d, and the wings 15a and 15b is hinged to the rigid parts 45a and 45b at locations being situated at two different radii. In this manner of hinging the wings to the rotor at two different radii, an interaction between the flap load of the wing and the pitch angle of the wing is provided, as a flap load having a component normal to a line passing through for instance the hinge at the leading edge of one of the wings and the hinges at trailing edge of the other wing will cause a change of the pitch of the wings. This interaction is enhanced by the oblique position of the teeter shaft 40.

Figure 5:
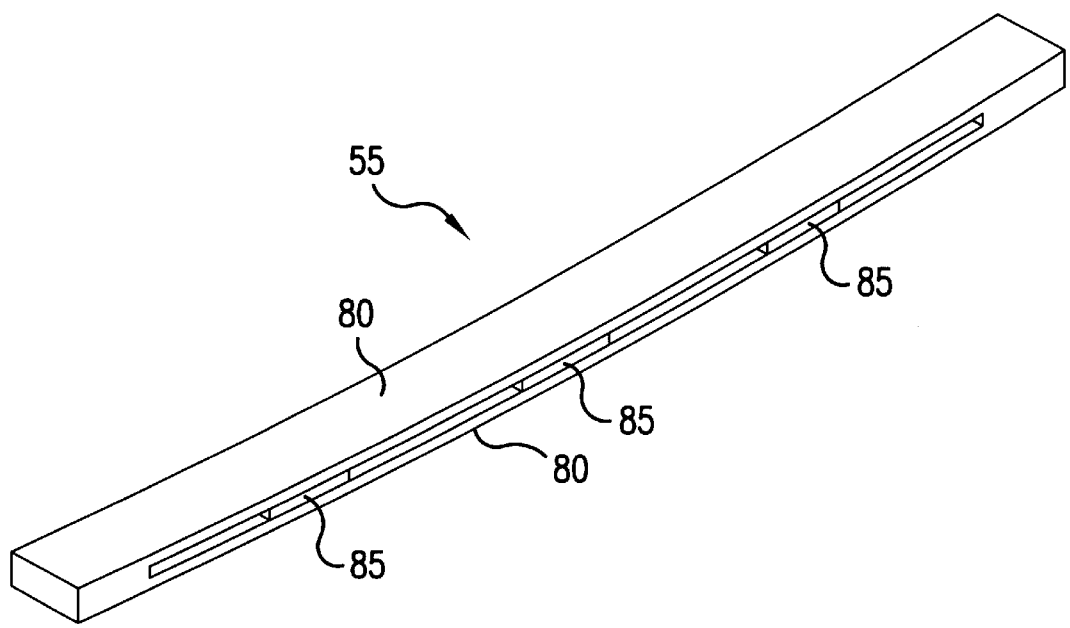
FIG. 5 shows a flex-beam for controlling the coning of the wings of a wind turbine according to the present invention.

The flex-beam 55 is preferably an integral part of the wing of the rotor and extends partly inside the wing. As the flex-beam must be able to bend so much as to allow the wing to cone so much as up to around 60–70° and in some situations even more, the flex-beam must be designed according to this requirement. When such a high bending is applied to the flex-beam it must be designed to be able to withstand large shear and the flex-beam is therefore preferably made as a sandwich construction wherein the extreme parts 80 of the flex-beam is made of reinforced plastic such as glass fibre as indicated on FIG. 5 which is showing an exemplified flex-beam 55. The intermediary part(s) 85 of the flex-beam is made of rubber in order for the flex-beam to be able to damp out coning vibrations of the wings As the load of the wings is transferred to the hub via the bearings 60 of FIG. 2, the need for an ordinary used spar and/or webs normally used for transferring the loads of the wings to the hub is no longer present. Therefore, a wing according to the present invention substantially only comprises a shell, which constitutes the aerodynamic shape. This means that the wing may be made very lightweight, whereby the dynamics and also the energy extraction of the rotor may be very desirably optimised.

The shell of the wing according to the present invention is preferably made out of reinforced plastic such as glass fibre, but as the strength of the wings is provided by the shell of the wings material such as iron or aluminium or the like may be used as wing material.

The wings according to the presently most preferred embodiment of the invention are reinforced in the vicinity of the root sections in order for attaching the flex-beams to the wings. The attachment of the flex-beam to the wing is preferred to be substantially rigid, but the flex-beam may just as well be fitted loosely into the interior of the wings whereby the flex-beam will be able to slide inside the wing, a situation which is advantageous in case where large bending deformation is applied to the flex-beam during coning of the wing.

Figure 6:
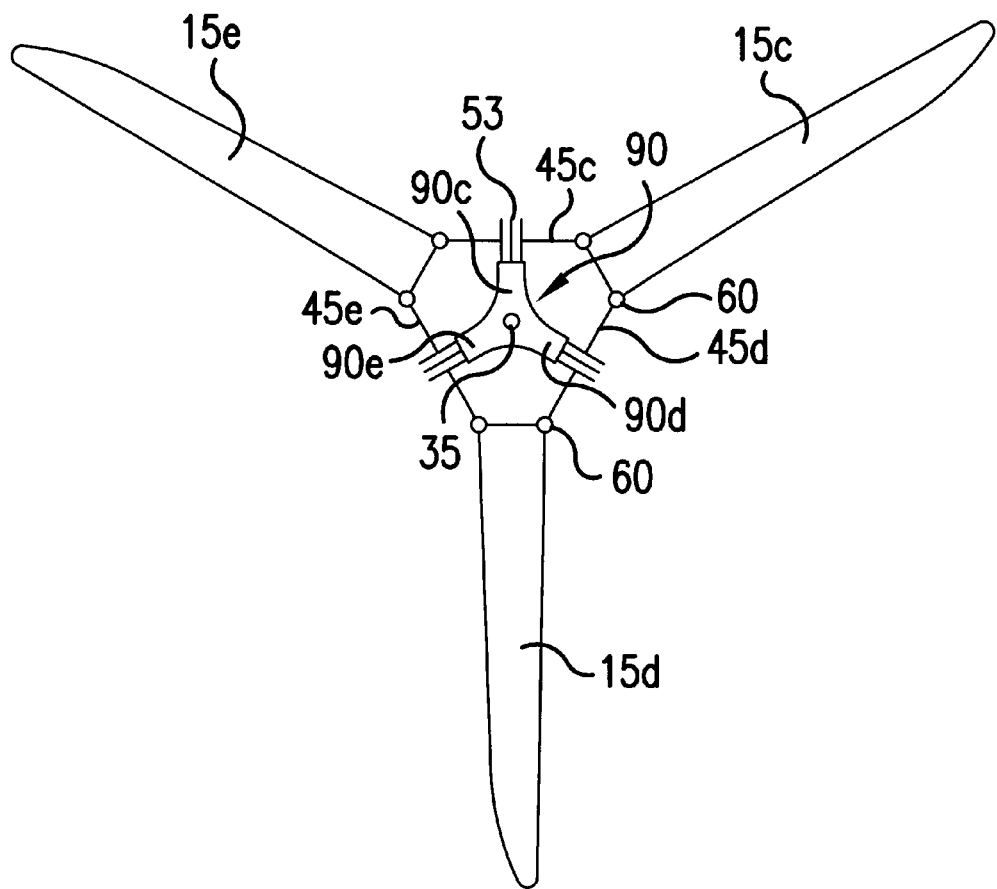
FIG. 6 shows a hub according to the present invention used in a three-wing configuration.

In FIG. 6a hub 30 used in a rotor configuration having three wings is shown. In this embodiment of the present invention, the hub 30 comprises three hub main parts 45c, 45d and 45e. The three wings 15c, 15d and 15e are connected to the hub main parts in the same manner as in the embodiment of the rotor comprising two wings, i.e. by use of spherical bearings 60 giving two geometrical movements.

Again, the wings of the rotor 10 are interacting so that the pitch of the wings occur simultaneously and synchronously as the hub main parts 45c–e are attached to a central hub part 90. A possibility of the rotor to teeter may be applied to this preferred embodiment of the present invention by connecting the central hub part 90 to the main shaft 35 by use of spherical bearing allowing the rotor to at the same time to teeter and to transfer the torque produced by the rotor to the main shaft 35.

The bearings used for connecting the wings to the hub main parts 45c–e may be spherical bearings allowing the wings to cone in the same manner as in the preferred embodiment comprising only two wings described above. Furthermore, the hub assembly 30 also in this preferred embodiment comprises a neutral position and therefore the pitch angle of the wings may also in this case be pre-set to an angle either providing the optimum wind energy extraction or to an angle allowing the wings to brake the rotor.

The hub main parts 45c–e is in this embodiment pivotally connected to the central hub part 90 by use of bearings 53 in order to enable these parts to rotate around a longitudinal axis of one of the arms, say 90c, of the central hub part 90.

The coning of the wings is also in this preferred embodiment of the present invention controlled by use of a flex-beam (left out from the drawing only to clarify the general concept of this preferred embodiment of the present invention). This flex-beam serve the same purpose as it serves in the embodiment having only two wings, and the dimensioning and design of it follows the same considerations as described above.

What is claimed is:

1. A rotor (10) having an axis of rotation, said rotor (10) comprising a hub assembly (30) and at least two wings (15a, 15b) each having a leading edge (20) and a trailing edge (25), each of the wings (15a, 15b) being connected to the hub assembly (30) in at least two suspension points (50a, 50b) so that the pitch of the wing (15a, 15b) may be controlled by displacing at least one of the suspensions points (50a, 50b), characterized in that the hub assembly (30) comprises at least two hub main parts (45a, 45b) each of which is pivotally connected to a central hub part (40, 90) of the hub assembly (30), wherein each of the hub main parts (45a, 45b) extends at least from one suspension point (50a) arranged substantially in the vicinity of the leading edge (20) of the root section of one wing pass the central hub part (40, 90) and to another suspension point (50d) arranged substantially in the vicinity of the trailing edge (25) of the root section of another wing:

so that the at least two hub main parts (45a, 45b) of the hub assembly (30) may be pivoted around an axis being inclined with respect to a longitudinal direction of each of the hub main parts (45a, 45b) so as to displace at least one of the suspension points (50a, 50b) whereby the pitch of the wings is altered.

2. A rotor according to claim 1, characterized in that the central hub part (40, 90) of the hub assembly (30) is substantially rigidly connected to a main shaft (35) of the rotor.

3. A rotor according to claim 2, characterized in that the hub main parts (45a, 45b) are connected to the hub central part (40, 90) through bearings (53) and characterized in that the hub assembly (30) is provided a teeter stiffness for controlling the teeter motion of each of the at least two wings.

4. A rotor according to claim 3, characterized in that the bearings (53) through which the hub main parts (45a, 45b) are connected to the hub central part (40, 90) are rubber bearings and characterized in that the teeter stiffness is provided by at least one of the rubber bearings.

5. A rotor according to claim 2, characterized in that each wing (15a, 15b) is connected to the hub main parts (45a, 45b) at the suspension points (50a, 50b) by use of spherical bearings.

6. A rotor according to claim 1, characterized in that the central hub part (40, 90) of the hub assembly (30) is pivotally connected to the main shaft (35) so as to allow the angle between the plane defined by the sweeping motion of the at least two wings (15a, 15b) upon rotation and the axis of rotation of the main shaft (35) to be a geometrical degree of freedom.

7. A rotor according to claim 2, characterized in that each of the hub main parts (45a, 45b) is pivotally connected to the central hub part (40, 90) of the hub assembly in such a manner that the at least two main parts (45a, 45b) of the hub assembly (30) may be pivoted synchronously around an axis being inclined with respect to the longitudinal direction of each of the hub main parts (45a, 45b) so as to allow the angle between the plane defined by the sweeping motion of the at least two wings upon rotation and the axis of rotation of the main shaft (35) to be a geometrical degree of freedom.

8. A rotor according to claim 1, characterized in that the hub assembly (30) further comprises connecting means (60) arranged at each suspension point (50a, 50b) for hingedly connecting the wings to the hub main parts (45a, 45b) so as to allow the angle between the longitudinal extension of the wings (15a, 15b) and the axis of rotation of the rotor (10) to be a geometrical degree of freedom whereby the wings (15a, 15b) may cone.

9. A rotor according to claim 8, characterized in that the hub assembly (30) further comprises means (55) for controlling the coning of the wings (15a, 15b).

10. A rotor according to claim 9, characterized in that the coning controlling means are flex-beams (55) one for each wing of the rotor, the flex-beams are made of a flexible material and each of the flex-beams is individually attached to at least the root section of one wing and to the hub assembly (30).

11. A rotor according to claim 10, characterized in that each flex-beam (55) is an integral part of a wing.

12. A rotor according to claim 10, characterized in that each flex-beam (55) is connected to the hub assembly (30) via a hydraulic means, such as a hydraulic piston.

13. A rotor according to claim 9, characterized in that the coning controlling means (55) is a hydraulic means connected to a wing and to the hub assembly (30).

14. A rotor according to claim 1, characterized in that the hub assembly (30) further comprises at least one auxiliary part (70) having a support member (70b) extending form one hub main part (45b) to a position where another hub main part (45a) of the hub assembly (30) is connected to the central hub part (40, 90).

15. A rotor according to claim 14, characterized in that the hub assembly (30) further comprises at least one crossbeam (70a) extending from one hub main part (45b) to the support member (70b) extending from the same hub main part.

16. A rotor according to claim 15, characterized in that each of the flex-beam (55) of each wing is connected to a crossbeam (70a).

17. A rotor according to claim 14, characterized in that the auxiliary part (70) is an integral part of each of the hub main parts (45a, 45b).

18. A rotor according to claim 1, characterized in that the hub assembly (30) further comprises means for controlling the pitch of the wing.

19. A rotor according to claim 18, characterized in that the pitch controlling means is a hydraulic piston connected at one end to one hub main part (45a) and at the other end to another hub main part (45b).

20. A rotor according to claim 18, characterized in that the pitch controlling means is a hydraulic piston connected at one end to the central part (40, 90) of the hub assembly (30) and at the other end to a hub main part (45a).

21. A rotor according to claim 1, characterized in that the rotor comprises three wings (15c, 15d, 15e).

* * * * *